United States Patent [19]

Le Bec

[11] 4,327,602

[45] May 4, 1982

[54] EMERGENCY RELEASE DEVICE FOR A TOE CLIP STRAP

[75] Inventor: Dominique Le Bec, Neuilly-sur-Seine, France

[73] Assignee: Poutrait-Morin, Aubervilliers, France

[21] Appl. No.: 60,199

[22] Filed: Jul. 14, 1979

[30] Foreign Application Priority Data

Jul. 28, 1978 [FR] France ............................... 78 22440
Jun. 29, 1979 [FR] France ............................... 79 17000

[51] Int. Cl.³ ........................ G05G 1/14; A44B 21/00
[52] U.S. Cl. .............................. 74/594.6; 24/201 R; 24/230 TC
[58] Field of Search ............. 74/594.6, 594.4; 24/735 G, 201 TR, 260, 230 TC, 201 R; 36/117, 120, 122; 280/11.3, 11.31, 613, 618, 611, 619, 620

[56] References Cited

U.S. PATENT DOCUMENTS

| | | | |
|---|---|---|---|
| 3,776,565 | 12/1973 | Granville | 24/201 TR X |
| 3,812,811 | 5/1974 | Rodriguez | 24/201 TR X |
| 4,042,257 | 8/1977 | Salomon | 36/117 X |
| 4,130,297 | 12/1978 | Horn | 280/618 |
| 4,165,883 | 8/1979 | Weigl et al. | 280/618 |
| 4,172,392 | 10/1979 | Foster | 74/594.6 X |

FOREIGN PATENT DOCUMENTS

| | | | |
|---|---|---|---|
| 796362 | 4/1936 | France | 74/594.6 |
| 895334 | 1/1945 | France | 24/201 TR |
| 1669 | of 1895 | United Kingdom | 74/594.6 |
| 16890 | of 1905 | United Kingdom | 74/594.6 |
| 25068 | of 1908 | United Kingdom | 74/594.6 |

*Primary Examiner*—Kenneth Dorner
*Attorney, Agent, or Firm*—Charles E. Brown

[57] ABSTRACT

An emergency release device for the strap of a toe clip for a bicycle pedal. The release device comprises a release member pivotally mounted on free end of the toe clip. One end of the strap is attached to the release member and the other passes through an aperture in a buckle associated with the release member. In one embodiment the buckle consists of a buckle lever, and a passageway is provided through the release member itself. In another embodiment the release member is releasable attached to the buckle. The release member includes a latching member and in response to the pivoting of the rider's foot in the pedal the force exerted on the strap displaces the latching member to its inoperative position. The release member pivots relative to the toe clip thereby permitting the rocking of the buckle lever in the first embodiment or the release of the buckle through a hooking member in the other embodiment. In either case the binding force around the rider's foot is relaxed without the rider having to loosen the buckle by hand.

20 Claims, 13 Drawing Figures

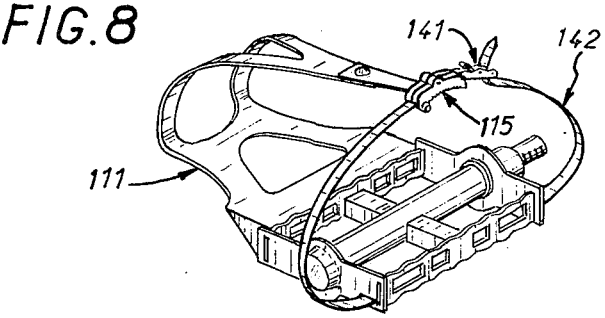
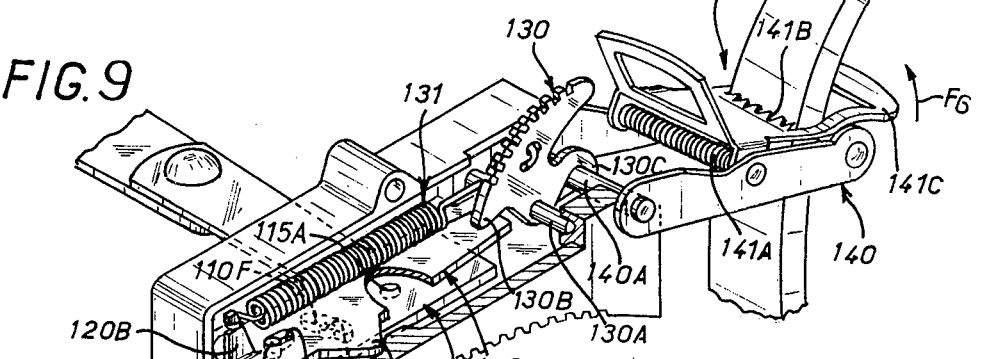
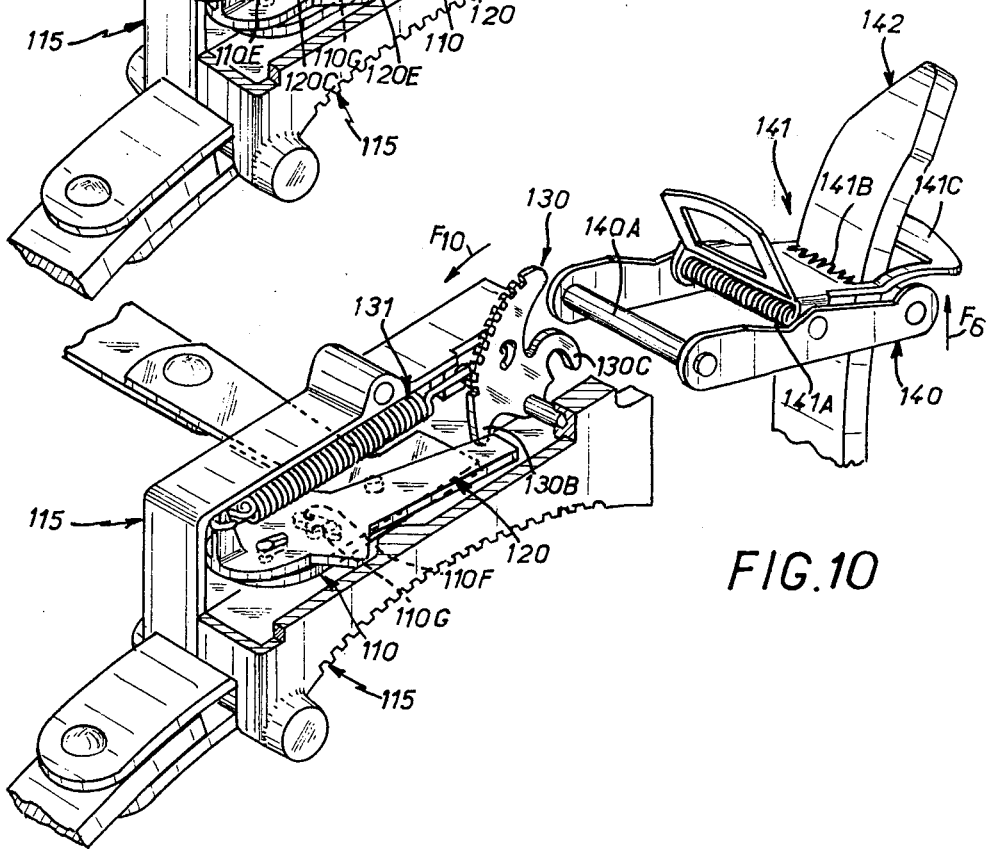

ced, given by way of example, with reference to the
EMERGENCY RELEASE DEVICE FOR A TOE CLIP STRAP

FIELD OF THE INVENTION

The present invention relates to an emergency release device for the strap of a toe clip.

BACKGROUND OF THE INVENTION

As is well known toe clips which are fixed to the pedals of bicycles and other similar vehicles are typically provided with a strap at one end of which is a buckle which permits the strap to be tightened around the toe of the rider's shoe and permits his foot to be freed by actuating a release member on the buckle which allows the strap to slide through the buckle.

Yet in order to free his foot the rider must lean over to actuate the release member with his hand, and therefore to dismount he must loosen the buckles on both the right and the left toe clip.

When the rider has ample time to perform these actions there is no special problem, but when the rider is caught by surprise and must dismount quickly he generally does not have the time to free even one of his feet and he risks falling and injury owing to the fact that he is literally bound to his machine by his feet which are held tightly in the toe clips.

Such drawbacks have been increased by the use of special groove soled shoes the groove of which is engaged in the side of the pedal.

SUMMARY OF THE INVENTION

An object of the present invention is to overcome such drawbacks by providing a compact device of simple and rugged construction which enables the rider to free his feet from the toe clips immediately when necessary.

According to a further object of the invention there is provided emergency release device comprising a release member mounted at the free end of the portion of the toe clips rising over the rider's foot, means for securing one end of the strap to the release member throughout operation. The other end of the strap is releasably secured relative to the release member. The release member has detent means responsive to a force exerted by the rider's foot against the strap to free the other end of the strap relative to the release member.

According to a more specific object of the invention there is provided an emergency release device for the strap of a toe clip comprising a release member which is pivotally mounted on and extends to either side of a plate member fixed to the toe clip per se. One portion of the strap is secured to said release member to one side of the pivotal connection, and the other portion of the strap is adapted to be passed through a buckle. Said release member has a latched position in which the strap is adapted to be tightened by means of the buckle and a release position in which the strap is released by a force exerted by the rider's foot against the strap.

The release device which thus controls the buckle comprises a latching member cooperable with camming surfaces for maintaining the latching member in its latched position in which the strap may be tightened, the latching member being releasable in response to the force exerted by the rider's foot against one portion or the other of strap.

Such an emergency release device which is of compact construction, lightweight, rugged and easy to operate, is a particularly useful accessory for toe clips. Bearing in mind that such a release device makes it possible to extracate the rider's feet virtually instantaneously by simple pivoting action of the rider's feet, it will be understood that this will permit the rider to keep his hands on the handlebar while freeing his feet from the toe clips. Accordingly not only is the rider able to extracate himself from his bike but also he may better control it since does not have to lean over to each side to release his toe clip buckles by hand. This advantage is all the more important in case of an incipient accident or when riding over dangerous terrain.

Other features and advantages of the present invention will become apparent from the description which follows, given by way of example, with reference to the accompanying drawings.

BRIEF DESCRIPTION OF THE DRAWINGS

FIG. 8 illustrates a perspective view of a pedal fitted with a toe clip having a strap provided with an emergency release device according to an alternative embodiment;

FIG. 9 is a perspective view of the release device according to the alternative embodiment in its latched position;

FIG. 10 is a view similar to that of FIG. 9 for the release device in its unlatched position;

DETAILED DESCRIPTION OF THE PREFERRED EMBODIMENTS

Figure 1:
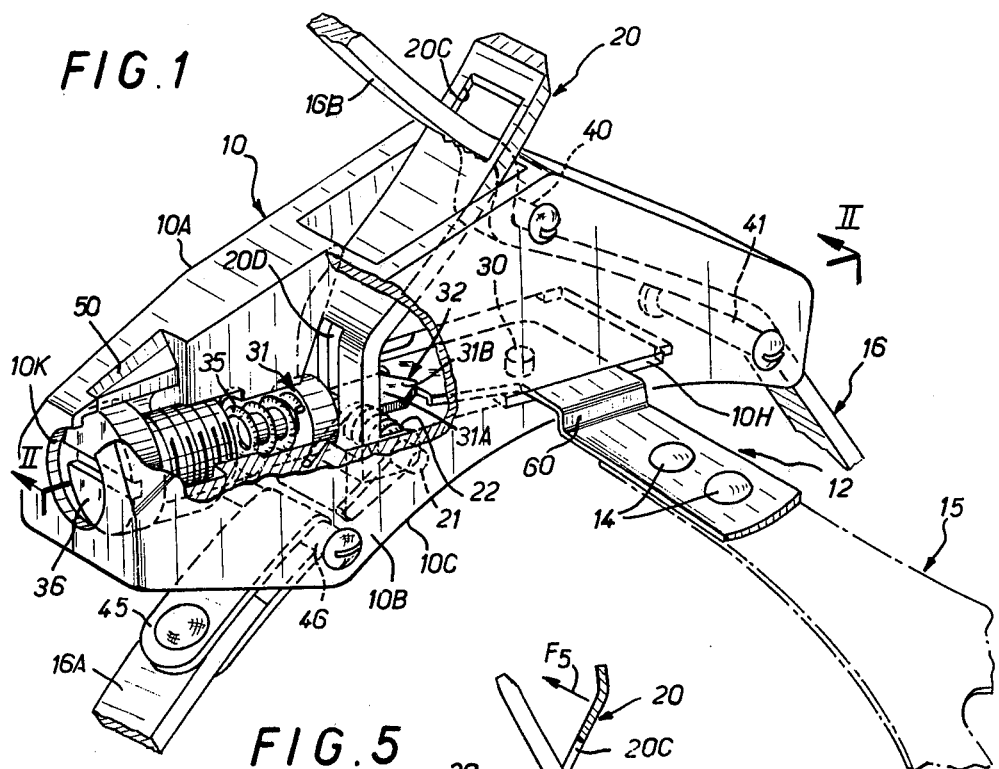
FIG. 1 is an enlarged perspective view, partly cutaway, of an embodiment according to the invention.
Figure 5:
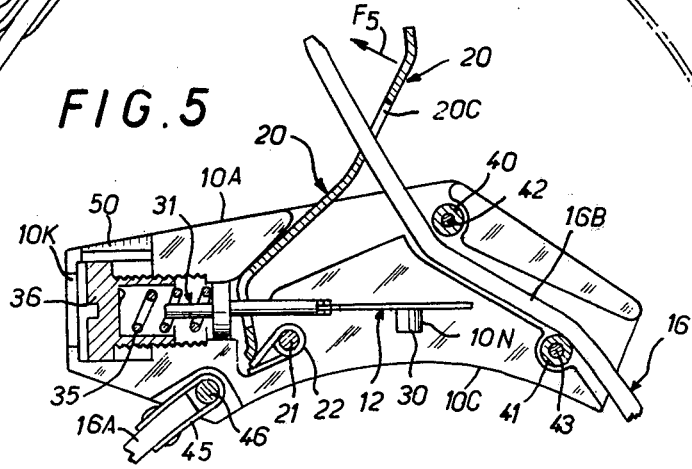
FIG. 5 is a view taken along a plane including line V—V in FIG. 4, with the latching member and the plate member viewed in plan.

In the embodiment of FIGS. 1-5 the emergency release device for the strap of a toe clip comprises a release member 10 which has an overall boxlike configuration including a housing formed of two parts 10A,10B assembled together with an arcuate lower side 10C. The housing is pivotally mounted by means of a pintle 13 on a plate member which is adapted to be rivoted at 14 to the end of the rising portion of the toe clip which is indicated in phantom lines at 15.

The longitudinal axis of the housing of the release member 10 is disposed transversely relative to the rising portion of the toe clip the housing being secured to a strap portion 16A adjacent the lower side 10C of the housing. The other portion 16B of the strap is received in a passageway running from a lateral side of the housing and leaving through the upper side of the housing via an aperture 20C in a buckle indicated by general reference numeral 20.

The buckle 20 comprises bent lever having two depending lugs 20A,20B (FIG. 4) in engagement with a pivot pin 21. A return spring 22 surrounding the pivot pin 21 urged the buckle lever in the direction of arrow F in FIG. 2.

The interior of the housing has a configuration adapted to permit swinging of the buckle lever axially to cavities 10D,10E formed in parts 10A,10B of the housing. The parts 10A,10B of the housing also have cavities 10F,10G which define the passageway for strap 16.

The parts 10A,10B of the housing each comprise proximate to the lower side 10C, a channel 10H opening on the lateral faces of the housing so as to permit the engagement of the terminal end of the plate member 12 inside the housing and the pivotal mounting of the release member 10.

The interior walls of parts 10A,10B are also configured to accommodate a retractable latching member designated by general reference numeral 31.

The retractable latching member 31 comprises, in the illustrated embodiment, a flat member 31A with a pointed forward end 31B defining the cam means 32 cooperable with the aforementioned inclined camming surfaces 12A,12B and a rearward portion 31C urged by a compression coil spring 35 adjustable by a pressure screw 36 which is accessible through an opening 10K formed in the adjacent lateral sidewall of the housing.

Between the forward end 31B and the rearward end 31C the latching member 31 has a portion 31D of reduced section which is received in longitudinal a slot 20D formed in the buckle lever. Shoulders 31E are formed to each side of the portion 31D of reduced section so that the latching member 31 is in abutment with the buckle lever to swing it from its operative position to its inoperative position.

It is also to be noted that the forward end 31B of the releasable latching member is guided along its longitudinal sides in grooves 10L,10M formed in the respective parts 10A,10B of the housing.

Instead of the plate member 12 being mounted on the toe clip as shown, a suitable cutout may be formed in the rising portion of the toe clip, in which case the pintle will be fitted thereon.

In the illustrated embodiment the pintle 30, fixed to the plate member 12, is received in complementary bushes 10N formed in each of the housing parts 10A,10B. The height of the channel 10H being selected to that the sides of the plate member 12 are in snug engagement with the walls or the channel 10H and the release member 10 is then in snug pivoting contact with the plate member.

The plate member 12 comprises a central notch forming two symmetrical, inclined camming surfaces or ramps 12A,12B and two indentations 12C,12D located beyond the camming surfaces or ramps and shallower than the central notch. The shape of the central notch in plan view is complementary to that of the forward end 31B of the releasable latching member 31.

The part 16B of the strap 16 follows a zigzag path through the release member 10 over rollers 40,41 which are advantageously provided with knurled or striated outer surfaces and mounted on pins 42,43 which also act as assembly means for connecting the parts 10A,10B of the housing together. At the outlet end of the passageway through the housing the free end of the strap portion 16B passes through the aperture 20C in the buckle lever as already noted.

The other strap portion 16A is fixed by U-clip 45 over a pin 46.

The release member 10 further comprises along its upper surface in line with the pressure screw 36 an elongated window 50 through which the aforesaid pressure screw 36 is viewable. Along an edge of the elongated window 50 is a graduated scale which gives the operator a visual indication of the force exerted by the pressure screw 36 by the position of the head of the pressure screw relative to the graduated scale.

The operation of the emergency strap release device for a toe clip described above may be analysed as follows, with reference to the position of the device shown in FIGS. 1-3, in which the strap 15 may be tightened. The latching member 31 is in its latching or operative position in which its cam portion 32 is in engagement with the central notch formed by the inclined camming surfaces or ramps 12A,12B formed in the edge of the plate member 12. In this position the longitudinal axis of the latching member of the release member 10 is in alignment with the plane of the center line of the toe clip strap.

Figure 4:
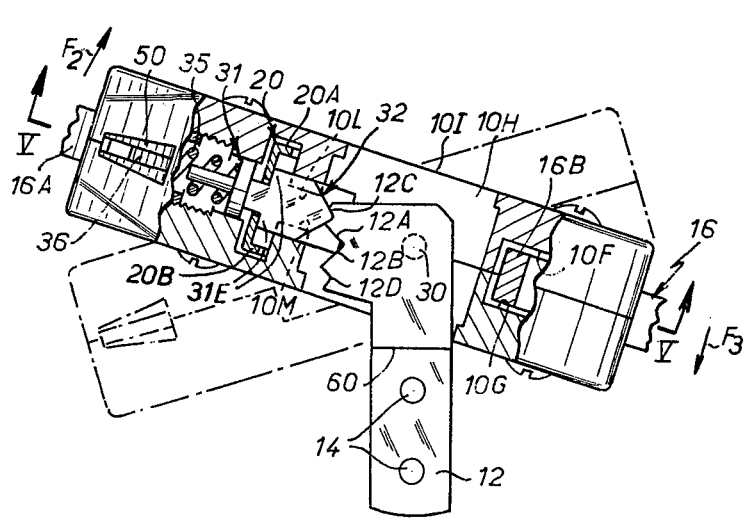
FIG. 4 is a view similar to that of FIG. 3 of the release member in its strap releasing position.
Figure 11:
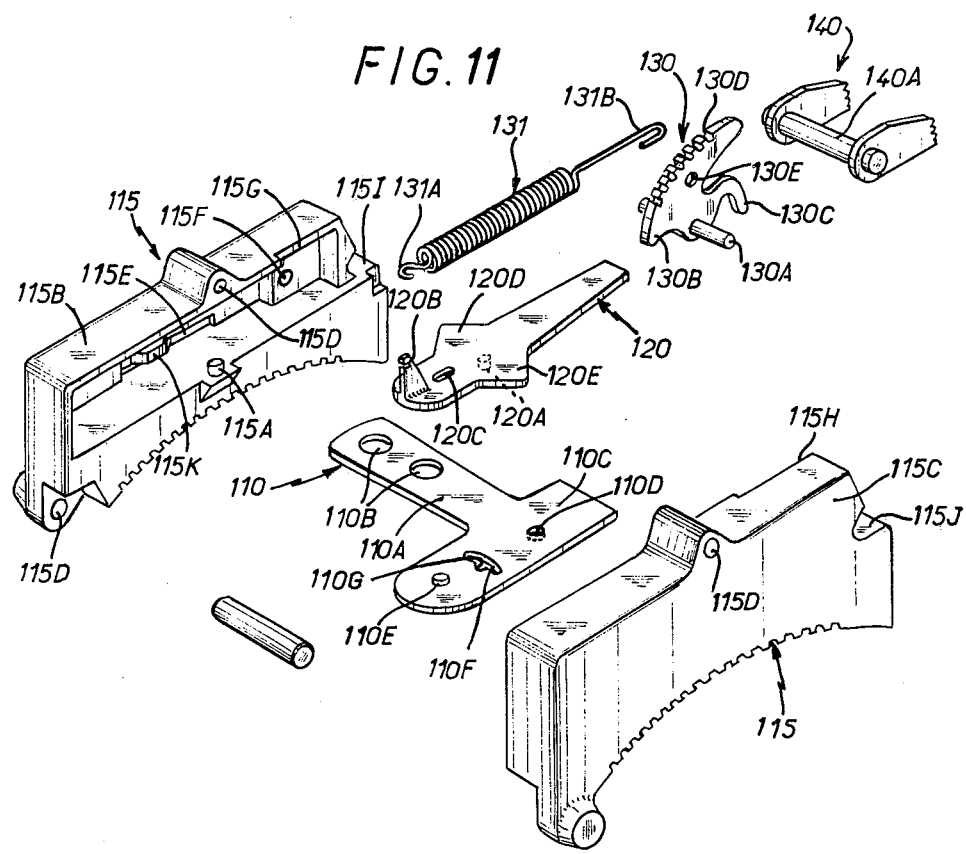
FIG. 11 is an exploded perspective view showing the various parts of the emergency release device of the embodiment of FIGS. 8-10.

When a torque, represented by arrows $F_2$ and $F_3$ in FIG. 4, is exerted by the rider's foot on the strap portions 16A,16B each of which is attached to the release member, the release member is swung around pintle 30. Since the plate member 12 is fixed against motion and the release member is swung around the pintle, the latching member is in the course of swinging displacement of the release member urged against the biasing force of the spring 35 under the action of the camming surface or ramp 12A and comes into wedging engagement with indentation 12C where it remains as long as an opposed torque is not exerted against the release member to return it to its initial position.

During the displacement of the latching member 31 the shoulders 31E rock (arrow $F_5$ in FIG. 5) the buckle lever about pivot pin 21 thus compressing spring 22. At this point the buckle 20 releases the strap portion 16B which now has a practically straightline path and the rider may easily slide his foot out of toe clip. Thus by a simple action of the rider's foot the toe clip strap is unbuckled without the rider having to maneuver the strap or the buckle with his hand.

It should be pointed out that if the release member 10 is swung through a slight angular displacement, i.e., if the cam portion 32 does not override the crest formed at the end of one of the ramps or camming surfaces 12A,12B the strap will be somewhat loosened because the buckle lever will have been rocked through a more or less pronounced angle and will modify the path of the strap portion 16B through the release member. But once the forward end 31B resumes its position in the central notch the strap 16 will be gripped again. It may then be tightened by exerting an upward traction force on the free end of strap portion 16B. This feature enables the rider to loosen the strap of the toe clip beforehand without requiring the device to be cocked manually.

Figure 7:
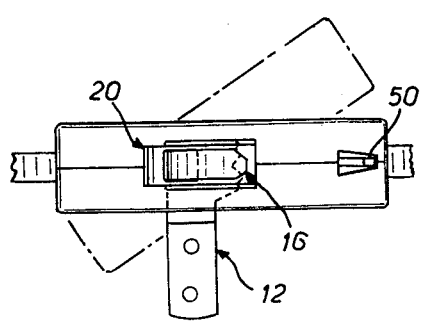
FIGS. 6 and 7 schematically illustrate, in plan view, a release device for the left pedal and the right pedal, respectively, of a bicycle.
Figure 6:
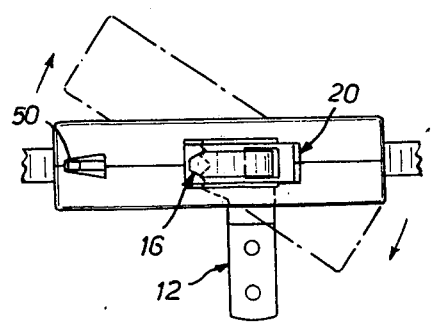

It goes without saying that such an emergency release device may equip the right pedal or the left pedal of a bicycle as shown in schematic FIGS. 6 and 7 owing to the through channel 10H which permits the plate member to be inserted from either side of the release member. In any case the plate member will be provided with an appropriate stepped bend 60 so that the free end of the rising portion of the toe clip is level with the underside of the release member.

Figure 2:
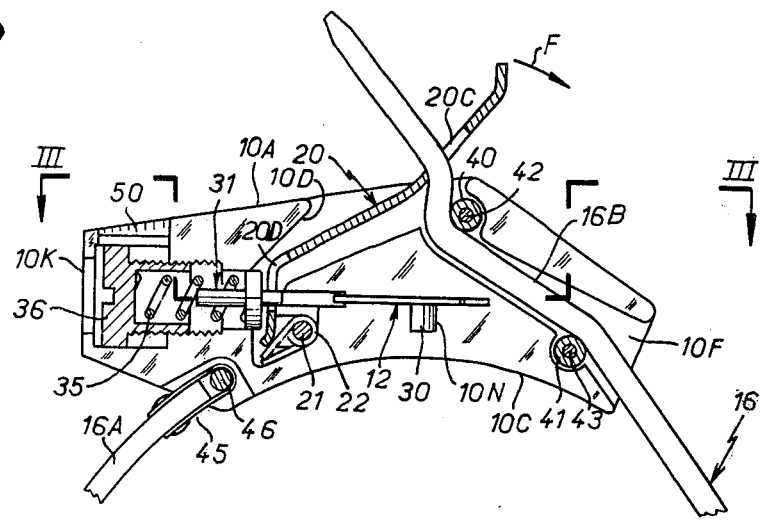
FIG. 2 is a cross-sectional view taken on line II—II in FIG. 1.
Figure 3:
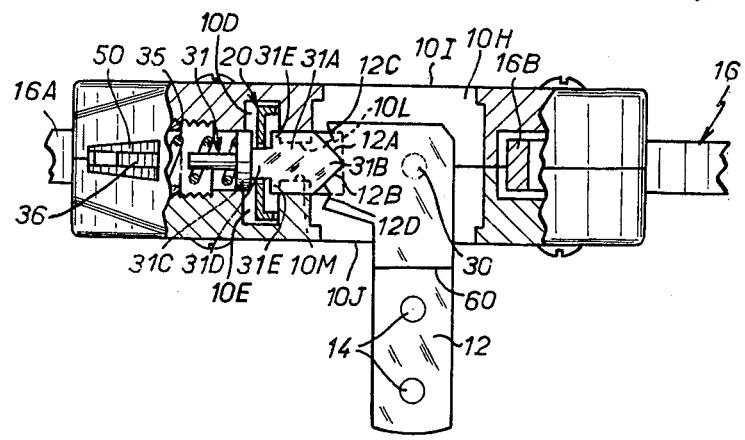
FIG. 3 is a sectional plan view taken on line III—III in FIG. 2.

It will noted in addition that the buckle lever may be pivoted to its inoperative position by hand by rocking the free end of the buckle lever against the force of spring 35 until it reaches a position corresponding substantially to the position illustrated in FIG. 2.

In the embodiment of FIGS. 8-13 the emergency release device for the strap of a toe clip comprises a plate member 110 which may be formed as a separate part or integrally formed with the end of the rising portion 111 of the toe clip which overlies the forward part of the rider's shoe.

In this embodiment the plate member 110 is a separate T-shaped member with a staff portion 110A comprises holes 110B by which it may be riveted to the rising portion 111 of the toe clip whereas the cross bar 110C has a hole 110D adapted to receive a pintle 115A fixed to the release member identified by general reference numeral 115. The cross bar 110C also comprises a cross slot 110F with a central indent 110G, between the hole 110D and a lug 110E.

The release member 115 advantageously comprises a housing in two parts 115B,115C having passages 115D for assembly means (not shown). Housing part 115B comprises a slot 115E for the staff portion 110A of the plate member and it also has an upstanding pivot pin or pintle 115A.

The interior of the housing is provided with means for accommodating a latching member 120, a hooking member 130 and a spring 131. An end of the interior of the housing, to the right in the drawings, is adapted to form an abutment for a stirrup 140 which is associated with the buckle 141 for tightened the strap 142.

The retractable latching member 120 is in the form of a flat, elongated part comprising a lug 120B protruding from the side overlying the plate member 110, which lug 120A is adapted to be received in the slot 110F in the plate member, and a lug 120B for attaching one end 131B of the coil spring 131. The latching member 120 further comprises a slot 120C adapted to receive the pivot pin 110E on plate member 110. Thus there is permitted pivotal movement of the retractable latching member 120 with respect to the plate member 110 about the pivot pin 110E on the latter; the latching member is guided during the pivotal movement by means of the lug 120A received in slot 110F.

As for hooking member 130 it comprises transverse journals 130A adapted to be received in bushes 115F formed in the side walls of the housing parts 115B,115C whereby the hooking member, which is accessible from outside the release member 115, may be rocked inside the housing. Two coextensive cutouts 115G,115H formed in the housing parts provide clearance for the hooking member 130.

The hooking member 130 also comprises a front nose portion 130B and a rear hooking finger 130C whereas between these two portions a substantially arcuate toothed sector 130D is provided. The toothed sector protrudes beyond the upper surface of the release member housing. A hole 130E in the hooking member 130 is provided for attachment of the other end 131B of the spring 131.

The buckle 140 (FIGS. 8-10) comprising a conventional tightening mechanism, that is to say, if the free end of the strap 42 is pulled the torsion spring 141A and the gripping teeth 141B hold the strap tight, whereas the strap is loosened by lifting the lever 141G in the counterclockwise direction (arrow $F_6$, FIGS. 9 and 10).

The stirrup member 140 of the buckle 141 is separable from and adapted to be coupled to the release member in this embodiment. The housing parts 115B,115C comprise bearing portions 115I,115J on which the bar 140I of the stirrup portions 140 bears, the intermediate portion of the bar 140A is adapted to cooperate with the rear hooking finger 130C of the hooking member 130.

Figure 12:
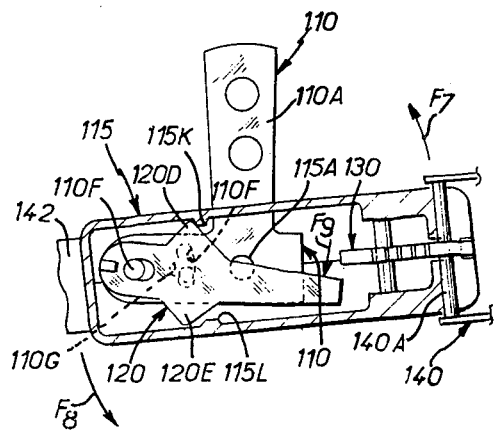
FIGS. 12 and 13 are plan views showing both unlatched positions of the release device.
Figure 13:
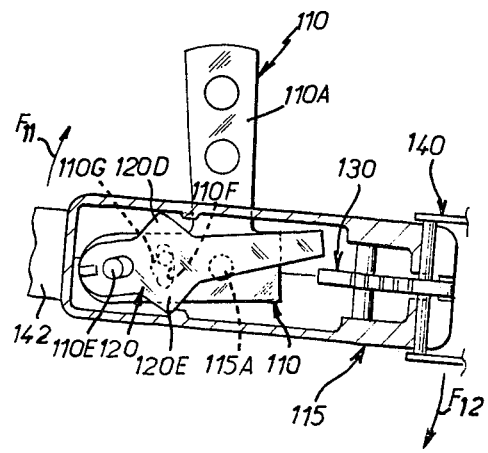

Each of the housing parts 115B,115C of the release member comprises a boss 115K,115L best seen in FIGS. 12 and 13, which is adapted to cooperate with one of cam portions 120D,120E formed on the latching member 120.

In FIG. 9 the emergency release device is represented in its stable central position, that is, the upper surface of the retractable latching member 120 abuts the front nose 130B on the hooking member 130 while the rear hooking finger 130C straddles bar 140A of the stirrup member 140 of the buckle 141. The bar 140 itself bears on bearing portions 151I,15J formed on the housing parts 115B,115C of the release device housing. The hooking member 130 is biased towards it open position by spring 131 and lug 120A is engagement in central indent 110G in continuation with slot 110F so that these parts are maintained in a stable central position in which the buckle 141 is hooked to the release member, the tightening or untightening of the strap 142 is carried out in the conventional manner as described above.

With such an emergency release device if the rider desires to quickly release his foot from a toe clip for any reason whatever, he pivots his foot in the toe clip parallel to the pedal so as to exert a lateral force on the strap 142. The lateral force is represented in FIG. 12 by arrows $F_7,F_8$ which causes the release member to swing relative to the plate member 110, the pintle 115A pivoting in the hole 110D in the plate member.

At the outset of swinging movement of the release member, boss 115K abuts against cam portion 120D on latching member 120 to pivot it about pivot pin 110E on the plate member, the latching member pivoting abruptly in the direction of arrow $F_9$ after slight rearward displacement during which the lug 120A escapes indent 110G. At the outset of pivotal movement of the latching member 120 the nose portion 130B on the hooking member 130 is released and is rocked in the direction indicated by arrow $F_{10}$ (FIG. 10) owing to its bias by spring 131 to the open position, thereby freeing the bar 140A and the buckle 141.

It will be readily understood that the rider has no hand manipulations to carry out and therefore is able to keep both hands on the handlebar.

It will be noted that an equivalent result is obtained if the rider's foot exerts a force in a direction opposite to that indicated above (arrows $F_{11},F_{12}$ in FIG. 13) in which case the release member 115 and the retractable latching member 120 will obviously be driven in the opposite direction to that discribed in respect to this embodiment.

Such an emergency release device which is of particularly compact and lightweight construction may be provided on a toe clip for a left or right pedal as represented in FIGS. 12 and 13 respectively. It is in fact easier for the rider to exert a lateral force with a heel of his shoe outwardly with respect to the bike.

In FIG. 12, as regards the right pedal, the force is exerted against the strap by turning the heel of the shoe outwards, in other words, the foot pivots counterclockwise; and in FIG. 12, as regards the left pedal, the force is exerted by turning the heel of the rider's shoe outwards to the left, i.e. clockwise. Owing to its construction the same emergency release device is adapted for either pedal.

After the emergency release device has been released it must be recocked which is accomplished by returning the latching member to its stable central position as shown in FIG. 9, by pivoting the release member around the pivot pin 115A while the hooking member 130 is simultaneously returned to its hooking position against the force of spring 131.

It should be pointed out that the stable central position of the retractable latching member 120 is defined by the combined effects of the camming portions 120D,120E cooperating with bosses 115K,115L, the spring and the lug 120A in engagement with the central indent 110G of the slot 110F.

Obviously the invention is not intended to be limited to the embodiments described and illustrated herein but on the contrary covers all alternatives, modifications and equivalents without departing from the spirit and scope of the present invention.

What is claimed is:

1. An emergency release device for the strap of a toe clip having a buckle adapted to tighten or loosen the strap, comprising a plate member adapted to be secured at a free end of a toe clip, a release member disposed transversely relative to said plate member, means for pivotally mounting said release member on said plate member, means associated with said release member for securing one portion of the strap on one side of said means for pivotally mounting said release member, another portion of the strap being adapted to pass through the buckle on the other side of the means for pivotally mounting said release member, said release member including a retractable latching member having cam means coacting with camming surfaces for normally maintaining said release member in an operative position in which the strap may be tightened by the buckle, said release member having an inoperative position in which the buckle is released to free the strap in response to a force exerted against the strap of the toe clip and the pivoting of said release member which ensues.

2. A device according to claim 1, wherein said camming surfaces are provided on said plate member, said release member also comprising a housing, and said latching being accommodated in said housing.

3. A device according to claim 2, wherein said housing further comprises a passageway for the other portion of the strap which is arranged substantially to one side of said means for pivotally mounting said release member relative to said latching member.

4. A device according to claim 3, further comprising means for slidably mounting said latching member for displacement inside said housing in a plane substantially parallel to said plate member, said cam means being provided at a forward end of said latching member, and compression spring means normally urging said cam means in contact with said camming surfaces.

5. A device according to claim 4, wherein said buckle comprises a single buckle lever rockably mounted in said housing and defining an aperture for the other portion of the strap leaving said passageway, an edge of said aperture adapted to cooperate with a part of said housing for gripping, and spring means for normally urging said buckle lever to a strap gripping position.

6. A device according to claim 5, wherein said buckle lever being bent and having a slot cooperating with said latching member for rocking said buckle lever from its strap gripping position to an open position.

7. A device according to claim 6, wherein said latching member has an intermediate zone of reduced section defining a shoulder for driving said buckle lever from its strap gripping position to its open position.

8. A device according to claim 1, wherein said camming surfaces are formed along an edge of said plate member and comprise a central notch defining two ramps coacting with said cam means on a forward end of said latching member.

9. A device according to claim 8, said notch being V-shaped, and further comprising an end-of-course indentation on each side of said central notch.

10. A device according to claim 2, wherein the free end of said plate member is accommodated inside said housing, a channel in said housing having wall portions in contact with sides of said plate member for guiding said release member on said plate member during pivotal movement of said release member.

11. A device according to claim 3, wherein said passageway through said release member comprises a zigzag pathway and wherein at least one idle roller is provided along said zigzag pathway over which the other portion of the strap is run.

12. A device according to claim 4, further comprising means for adjusting the biasing force exerted by said spring against said latching member comprising a screw, and an elongated opening in an upper wall portion of said housing having a graduated scale along an edge of said elongated opening for giving a visual indication of the biasing force applied against said latching member.

13. A device according to claim 1, further comprising a hooking member for releasably securing said buckle on said release member, said latching member normally maintaining said hooking member in its buckle securing position and freeing said hooking member for releasing said buckle in the inoperative position of said latching member.

14. A device according to claim 13, wherein said latching member is pivotally mounted at one end in a housing defined by said release member and comprises an end portion adapted to abut said hooking member and thereby secure said buckle relative to said release member, said cam means on said latching member coacting with said camming surfaces formed in said housing.

15. A device according to claim 13, wherein said buckle comprises a stirrup portion bearing against two spaced bearing surfaces formed at a distal end of said housing in the buckle securing position of said hooking member.

16. A device according to claim 13 or 15, wherein the median plane of said hooking member is substantially perpendicular to the median plane of said latching member, said hooking member further comprising a forward nose portion cooperable with said latching member in said operative position and a hooking finger cooperable with said stirrup portion of said buckle for securing the latter relative to said release member.

17. A device according to claim 13 or 15, further comprising a spring biasing said hooking member toward its buckle securing position, said spring means being connected at one end to said hooking member and at the other to said latching member.

18. A device according to claim 13, wherein said latching member comprises a said cam means protruding to each side of a line of symmetry of said latching member, said camming surfaces being formed on corresponding wall portions of the interior of said housing.

19. A device according to claim 17, wherein said cam means and said camming surfaces and said spring are adapted in combination to define a stable, unbiased, central position of said latching member.

20. A device according to claim 13, wherein said latching member comprises a depending lug cooperating with a slot formed in said plate member, and a longitudinal slot affording axial clearance for said lug.

* * * * *

UNITED STATES PATENT AND TRADEMARK OFFICE
CERTIFICATE OF CORRECTION

PATENT NO. : 4,327,602

DATED : May 4, 1982

INVENTOR(S) : Dominique Le Bec

It is certified that error appears in the above-identified patent and that said Letters Patent are hereby corrected as shown below:

On the title page, the filing date should read:

[22] Filed: Jul. 24, 1979

Signed and Sealed this

Third Day of August 1982

[SEAL]

Attest:

Attesting Officer

GERALD J. MOSSINGHOFF

Commissioner of Patents and Trademarks